United States Patent
Shillig et al.

(10) Patent No.: US 11,055,670 B1
(45) Date of Patent: Jul. 6, 2021

(54) SYSTEMS AND METHODS FOR GENERATING A TRAVEL SMARTLIST

(71) Applicant: UIPCO, LLC, San Antonio, TX (US)

(72) Inventors: Bonnie J. Shillig, San Antonio, TX (US); Shawn D. Low, San Antonio, TX (US); Todd Watts, San Antonio, TX (US); Dawn Elizabeth Wolff, San Antonio, TX (US); Michael W. Moltz, San Antonio, TX (US); Wendy J. Anderson, San Antonio, TX (US); Heather Messier Garcia, San Antonio, TX (US); Allen Josue Gonzalez, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 307 days.

(21) Appl. No.: 15/685,757

(22) Filed: Aug. 24, 2017

Related U.S. Application Data

(60) Provisional application No. 62/379,847, filed on Aug. 26, 2016.

(51) Int. Cl.
*G06Q 10/10* (2012.01)
*H04L 12/28* (2006.01)
(Continued)

(52) U.S. Cl.
CPC ....... *G06Q 10/1093* (2013.01); *G06F 3/0482* (2013.01); *G06F 3/0485* (2013.01); *G06Q 10/06311* (2013.01); *G06Q 10/109* (2013.01); *G06Q 10/1097* (2013.01); *H04L 12/2823* (2013.01); *H04L 12/2825* (2013.01); *H04L 12/2827* (2013.01); *G06Q 10/02* (2013.01); *G06Q 50/14* (2013.01); *H04W 4/021* (2013.01)

(58) Field of Classification Search
CPC ...... G06Q 10/109; G06Q 10/02; G06Q 50/14; G06Q 10/1093; G06Q 10/1097; G06Q 10/06311; H04W 4/021; H04L 12/2823; H04L 12/2825; H04L 12/2827; G06F 3/048; G06F 3/0481; G06F 3/0482; G06F 3/0484; G06F 3/04842; G06F 3/0485; G06F 3/04855
See application file for complete search history.

(56) References Cited

U.S. PATENT DOCUMENTS 5,745,110 A * 4/1998 Ertemalp .............. G06F 17/211
                                                345/440
5,884,306 A * 3/1999 Bliss ...................... G06F 3/0481
(Continued)

*Primary Examiner* — Mehmet Yesildag
*Assistant Examiner* — Thomas Yih Ho
(74) *Attorney, Agent, or Firm* — Perkins Coie LLP

(57) ABSTRACT

Methods and systems described in this disclosure describe generating a travel smartlist. In some implementations, the system can receive a location of travel and a date associated with the travel. The system can generate objects based on the location of the travel and the date and can organize the objects by categories and timeframes, the timeframes being in relation to the date. The system can cause a graphical user interface to display objects associated with a first category horizontally and display objects associated with a second category horizontally below the objects associated with the first category when a first timeframe is selected.

20 Claims, 12 Drawing Sheets

(51) Int. Cl.
*G06F 3/0485* (2013.01)
*G06Q 10/06* (2012.01)
*G06F 3/0482* (2013.01)
*H04W 4/021* (2018.01)
*G06Q 10/02* (2012.01)
*G06Q 50/14* (2012.01)

(56) References Cited

U.S. PATENT DOCUMENTS

| | | | | |
|---|---|---|---|---|
| 7,769,611 B1* | 8/2010 | Rodriguez | ............ | G06Q 50/32 705/7.11 |
| 9,223,461 B1* | 12/2015 | Brown | ................ | G06F 3/0485 |
| 10,332,297 B1* | 6/2019 | Vadodaria | ............ | G06F 3/0482 |
| 2001/0051935 A1* | 12/2001 | Sugiura | ................ | G06Q 10/10 706/12 |
| 2003/0156138 A1* | 8/2003 | Vronay | ................ | G06F 3/0481 715/772 |
| 2006/0248109 A1* | 11/2006 | Racovolis | ........... | G06F 16/9535 |
| 2008/0114809 A1* | 5/2008 | MacBeth | ............ | G06Q 10/109 |
| 2008/0155547 A1* | 6/2008 | Weber | ................ | G06Q 10/109 718/102 |
| 2008/0229307 A1* | 9/2008 | Maeda | ................ | G06F 9/5038 718/100 |
| 2008/0243564 A1* | 10/2008 | Busch | ................ | G06Q 10/02 705/6 |
| 2009/0063245 A1* | 3/2009 | Anderson | .......... | G06Q 10/0631 705/7.23 |
| 2009/0125817 A1* | 5/2009 | O'Sullivan | .......... | G06Q 10/109 715/753 |
| 2009/0174680 A1* | 7/2009 | Anzures | ............... | G06F 1/1626 345/173 |
| 2009/0313055 A1* | 12/2009 | Martin | ................ | G06Q 10/025 705/6 |
| 2011/0202837 A1* | 8/2011 | Fong | ................... | G06F 3/0485 715/702 |
| 2011/0252351 A1* | 10/2011 | Sikora | ................ | G06Q 10/109 715/769 |
| 2011/0276896 A1* | 11/2011 | Zambetti | ............ | H04L 12/1813 715/751 |
| 2012/0079408 A1* | 3/2012 | Rohwer | ................ | G06Q 10/06 715/772 |
| 2012/0290956 A1* | 11/2012 | Lance | ................ | G06Q 10/1093 715/764 |
| 2013/0072235 A1* | 3/2013 | Forstall | ................... | H04L 67/18 455/456.3 |
| 2013/0073325 A1* | 3/2013 | Ross | ...................... | G06Q 30/02 705/6 |
| 2013/0191836 A1* | 7/2013 | Meyer | ................... | G06F 9/4881 718/103 |
| 2013/0211948 A1* | 8/2013 | Lipscher | ............. | G06Q 10/109 705/26.5 |
| 2013/0268886 A1* | 10/2013 | Sureshkumar | ............ | G06Q 10/063116 715/810 |
| 2014/0053102 A1* | 2/2014 | Lee | ....................... | G06F 3/0482 715/810 |
| 2014/0129961 A1* | 5/2014 | Zubarev | ................ | G06F 3/0484 715/752 |
| 2014/0297348 A1* | 10/2014 | Ellis | ............... | G06Q 10/063114 705/7.15 |
| 2014/0358913 A1* | 12/2014 | Cai | ........................ | G06F 16/904 707/728 |
| 2015/0046856 A1* | 2/2015 | Rucker | ............... | G06F 3/04883 715/765 |
| 2015/0135088 A1* | 5/2015 | Lim | ................... | G06Q 10/1093 715/745 |
| 2015/0178690 A1* | 6/2015 | May | ...................... | G06Q 10/109 705/7.19 |
| 2015/0300892 A1* | 10/2015 | Malhotra | ................ | G01K 13/00 700/276 |
| 2015/0347586 A1* | 12/2015 | Fasen | ................. | G06Q 10/1093 707/722 |
| 2015/0347987 A1* | 12/2015 | Ali | ...................... | G06Q 10/1097 705/7.21 |
| 2015/0372832 A1* | 12/2015 | Kortz | ................... | H04L 12/2816 700/278 |
| 2016/0073257 A1* | 3/2016 | Duncan | ................ | H04W 12/06 726/7 |
| 2016/0300164 A1* | 10/2016 | Dailly | ................ | G06Q 10/025 |
| 2017/0103095 A1* | 4/2017 | Hsu | ........................ | G06F 16/955 |
| 2019/0272511 A1* | 9/2019 | Photowat | ............ | G06Q 50/01 |

\* cited by examiner

SYSTEMS AND METHODS FOR GENERATING A TRAVEL SMARTLIST

CROSS-REFERENCE TO RELATED APPLICATIONS

This application is a non-provisional of and claims priority to U.S. Provisional Application No. 62/379,847, filed on Aug. 26, 2016, entitled "SYSTEMS AND METHODS FOR GENERATING A TRAVEL SMARTLIST," which is hereby incorporated by reference in its entirety for all purposes.

TECHNICAL FIELD

Various embodiments of the present disclosure generally relate to traveling. More specifically, various embodiments of the present disclosure relate to methods and systems for generating a travel smartlist.

BACKGROUND

Planning a trip can take an inordinate amount of time and energy. Recent data shows that people often spend five to seven hours searching on the Internet for various accommodations, attractions, transportation, weather, timing, and other travel-related items.

BRIEF DESCRIPTION OF THE DRAWINGS

Embodiments of the present disclosure will be described and explained through the use of the accompanying drawings in which.

DETAILED DESCRIPTION

Figure 1:
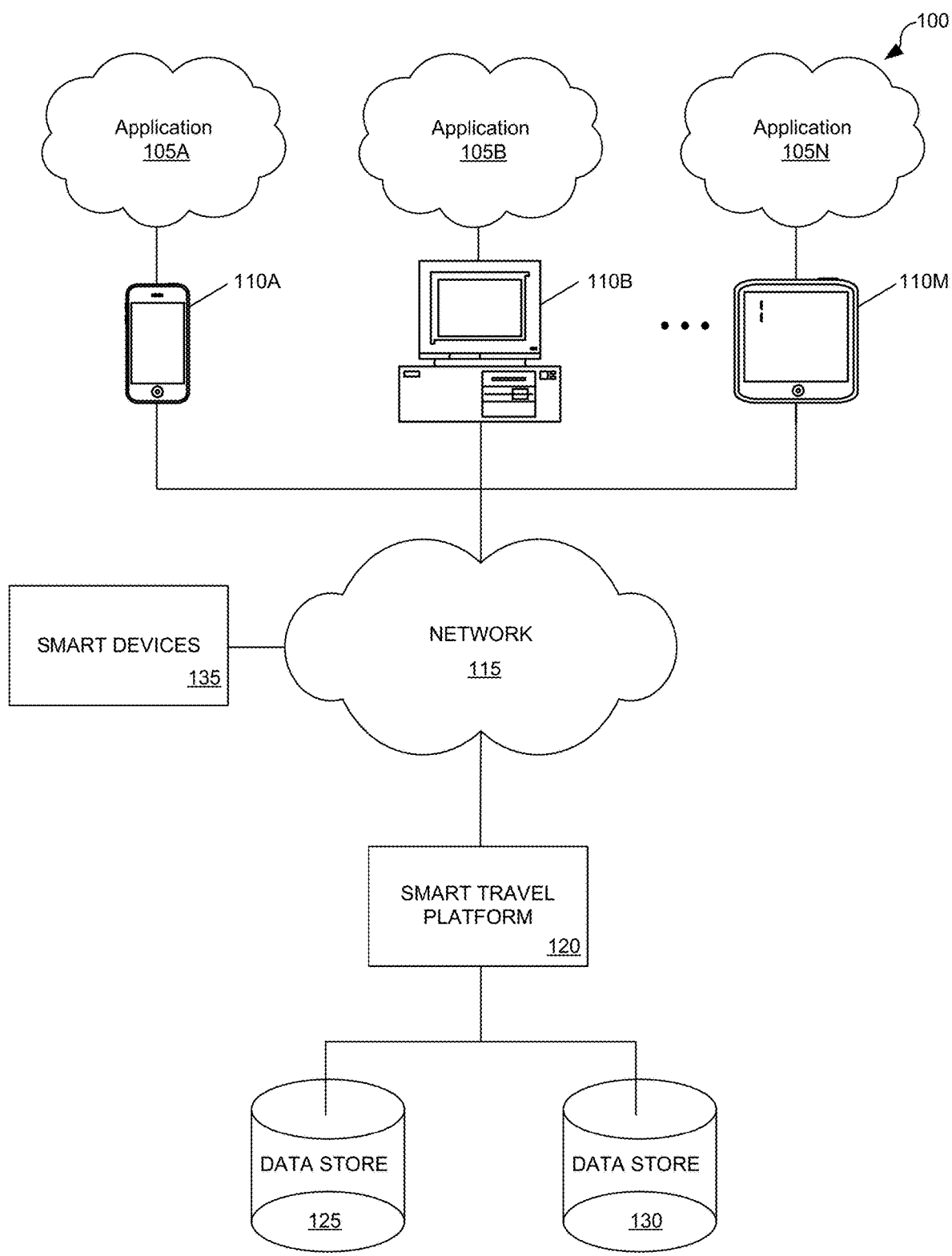
FIG. 1 illustrates an example of a network-based operating environment in accordance with various embodiments of the disclosure.

Various embodiments of the present disclosure generally relate to traveling. More specifically, various embodiments of the present disclosure relate to methods and systems for generating a travel smartlist.

Today, people spend hours making travel plans. Services like Expedia.com and Travelocity.com provide transportation and accommodation options but do not provide personalized, comprehensive travel planning tools. Depending on the purpose of travel (e.g., business, family vacation, wedding) and location of travel, travelers have many things to do, including reviewing budgets, generating checklists, boarding pets, checking health/safety information, and arranging transportation and lodging. Moreover, no tool exists for these travel tasks to be assigned to other users or for certain items to be monitored during the trip. Accordingly, what is needed is a system that generates a consolidated, shared travel smartlist.

This technology describes methods and systems for generating a travel smartlist to make preparing for travel, traveling, and returning home from traveling easier. The travel smartlist is an interactive, changing list of travel objects based on the user's basic travel plans (e.g., dates of travel, location of travel, purpose of travel). The travel objects can include resources (e.g., links to helpful websites), checklists (e.g., including hold mail, stop newspaper, apply for passport), and tips (e.g., "Carry a printed contact list in case your phone gets lost or damaged while traveling.").

The travel objects can be arranged by category (e.g., money, home, devices, packing) and timeframe relative to the travel dates (e.g., a few weeks prior to the trip, a few days before the trip, during the trip, after the trip). For example, certain checklists and reminders may be provided to the user one to three months before travel, and different checklists and reminders may be provided to the user a few days before the user is scheduled to travel. The user can add items to the list or check items off the list. The system may further provide notifications regarding travel before, during or after the trip (e.g., travel advisories, attractions, local news).

To create the checklists and to provide notifications, the system can collect information from various sources (e.g., government websites, banking websites, bill payment websites, sensors, news stations). Such information can include previous travel checklists, tips, attractions, lodging, transportation, discounts, profiles, bill pay websites, government-issued advisories, passport information, currency exchange rates, weather information, spending estimates, device settings, and smart device status.

When the user selects a timeframe, the objects can be displayed categorically. The objects in each category can be displayed horizontally such that the user can scroll horizontally to view the objects in the category. The categories can be arranged vertically (i.e., the user can scroll up or down to see additional categories of objects). The different timeframes can include the same or different categories, depending upon the user, the tasks that need to be completed, and the information that would be useful during the selected timeframe. In some embodiments, the user can scroll through checklists and check off items the user completed or does not need to see within a checklist.

This disclosure describes methods and systems designed to improve a user's travel experience by consolidating resources and checklists to create a travel smartlist. Various embodiments may provide one or more of the following technological improvements: (1) integration of tools and resources to provide a consolidated travel information center, eliminating the need for users to search numerous websites for travel information, (2) improved monitoring and notifications of travel-relevant information, (3) improved processes for generating personalized checklists, tracking checklists, and assigning tasks, (4) efficient display and organization of checklists, tips, and resources based on timeframes and categories, and (5) an application that is available on module devices to facilitate use while shopping, traveling, and planning.

In the following description, for the purposes of explanation, numerous specific details are set forth in order to provide a thorough understanding of embodiments of the present disclosure. However, it will be apparent to one skilled in the art on reading the disclosure that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to smart devices 135, smart travel platform 120, and data stores 125 and 130.

Computing devices 110A-110M may be configured to communicate via the network 115 with smart travel platform 120. In some embodiments, computing devices 110A-110M can retrieve or submit information to smart travel platform 120 and run one or more applications with customized content retrieved by smart travel platform 120, smart devices 135, and data stores 125 and 130. For example, computing devices 110A-110M can execute a browser application or a customized client to enable interaction among the computing devices 110A-110M, smart travel platform 120, smart devices 135, and data stores 125 and 130.

Network 115 can be any combination of local area and/or wide area networks, using wired and/or wireless communication systems. Network 115 can be or could use any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages, and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Smart travel platform 120 can be running on one or more servers and can be used to collect/store travel information; generate checklists; organize tasks and tips based on various factors such as timelines, purpose of travel, and location; monitor/receive updates from smart devices 135; communicate with outside computing systems; send alerts/notifications; store profiles and/or policies in data stores 125 and 130; and/or perform other activities. In some embodiments, smart travel platform 120 includes various data processing and analytic tools that allow for smart travel plan generation and execution. In some embodiments, smart travel platform 120 is a server.

Smart travel platform 120 may be communicably coupled with smart devices 135, data stores 125 and 130, and computing devices 110A-110M and may communicate, access, or receive data (e.g., previous travel checklists, tips, attractions, lodging, transportation, discounts, profiles, travel dates, bill pay websites, government-issued advisories, passport information, currency exchange rates, weather information, spending estimates, device settings, smart device status) from other computing devices 110A-110M, data stores 125 and 130, external websites and databases, and smart devices 135.

Data stores 125 and 130 can be used to manage storage and access to user data such as travel history, preferences, travel and health insurance policies, registered user devices, account information, outstanding bills, and other information. Data stores 125 and 130 may be a data repository of a set of integrated objects that are modeled using classes defined in database schemas. Data stores 125 and 130 may further include flat files that can store data. Smart travel platform 120 and/or other servers may collect and/or access data from the data stores 125 and 130.

Smart devices 135 can connect via network 115 to smart travel platform 120 and can be monitored by sensors. Smart devices 135 can be appliances, vehicles, and other objects that can be monitored while the user is away. Sensors on the smart devices 135 can monitor and/or collect data. For example, sensors can be coupled to a water heater, a refrigerator, an HVAC system, a freezer unit, and a vehicle. The sensors can periodically or intermittently monitor the appliances and transmit operating data to smart travel platform 120. The sensors can be running one or more applications, and operating system software, and can include one or more processors.

Figure 2:
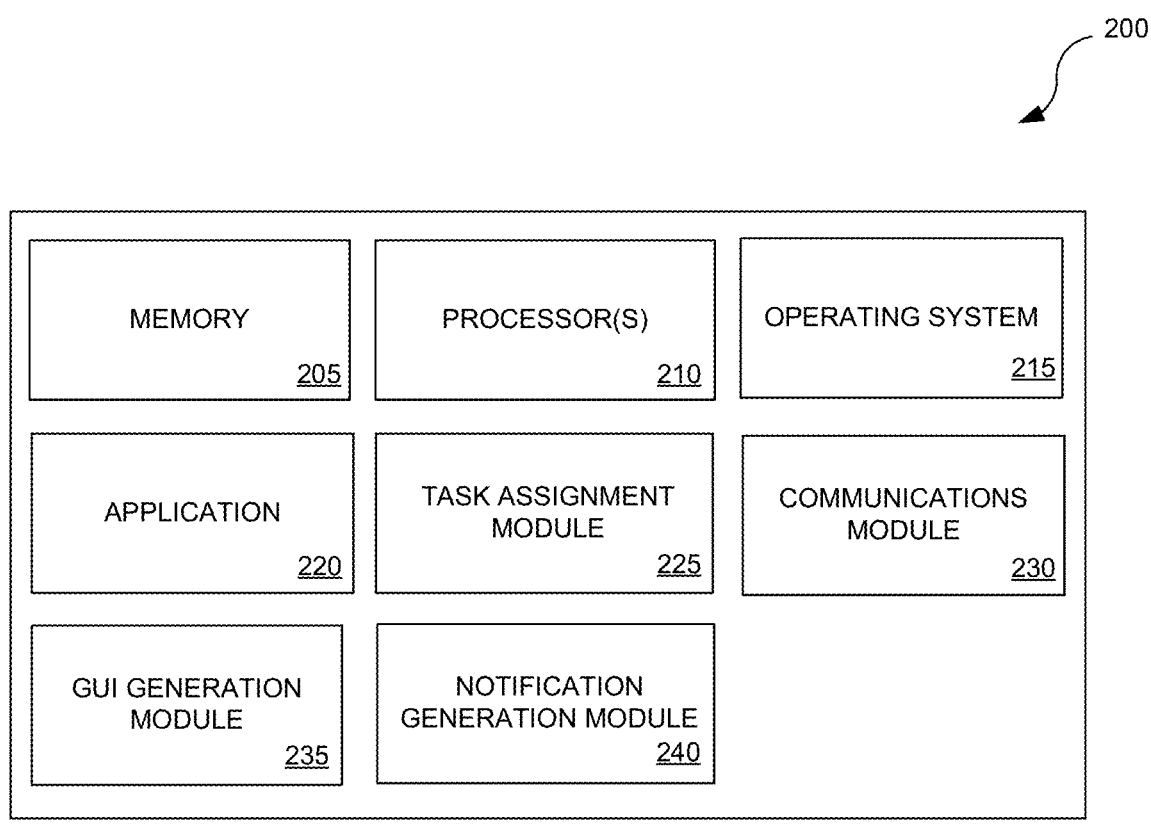
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, task assignment module 225, communications module 230, graphical user interface (GUI) generation module 235, and notification generation module 240. Other embodiments of the present disclosure may include some, all, or none of these modules and components along with other modules, applications, and/or components. Still yet, some embodiments may incorporate two or more of these modules and components into a single module and/or may associate a portion of the functionality of one or more of these modules with a different module. For example, in one embodiment, application 220 and task assignment module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, task assignment module 225, communications module 230, GUI generation module 235, and notification generation module 240.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with smart travel platform 120. For example, application 220 can include an application for financial services, a money transfer application, a social networking application, a travel management application, and a gaming application.

Application 220 can access a server and/or a platform associated with an organization (e.g., smart travel platform 120) to receive/collect trip information, assign/receive tasks to/from other devices, receive notifications and alerts relevant to the trip (e.g., checklist items, government-issued alerts), and check the status of or control smart devices.

Task assignment module 225 can assign tasks to other users. Task assignment module 225 can send the task assignment directly to other users or devices, or it can send a message to smart travel platform 120 to notify the other users. When a task is completed, the checklist can be updated and the user can receive a notification.

Communications module 230 can exchange communication with other user devices and/or a server (e.g., smart travel platform 120). For example, communications module 230 may send a communication to smart travel platform 120, other user devices, or smart devices 135, communicating updates to checklist items (e.g., status, new item), a command (e.g., turn the sprinklers on), or other information. Communications module 230 can receive a warning from smart travel platform 120 or smart devices 135 alerting the user that something must be done or that a device is exceeding a setting.

GUI generation module 235 can generate one or more GUI screens that allow for interaction with a user. In at least one embodiment, GUI generation module 235 generates a graphical user interface receiving and/or conveying information to the user. For example, the GUI generation module 235 may display information regarding the current device statuses, current travel destination conditions, current items left on the checklist, budget items, or different tips for the user.

Notification generation module 240 can generate notifications of deadlines or reengagement. Such notifications can be provided to the user or to other parties. The notifications can be provided before, during or after the trip (e.g., travel advisories, attractions, local news).

Figure 3:
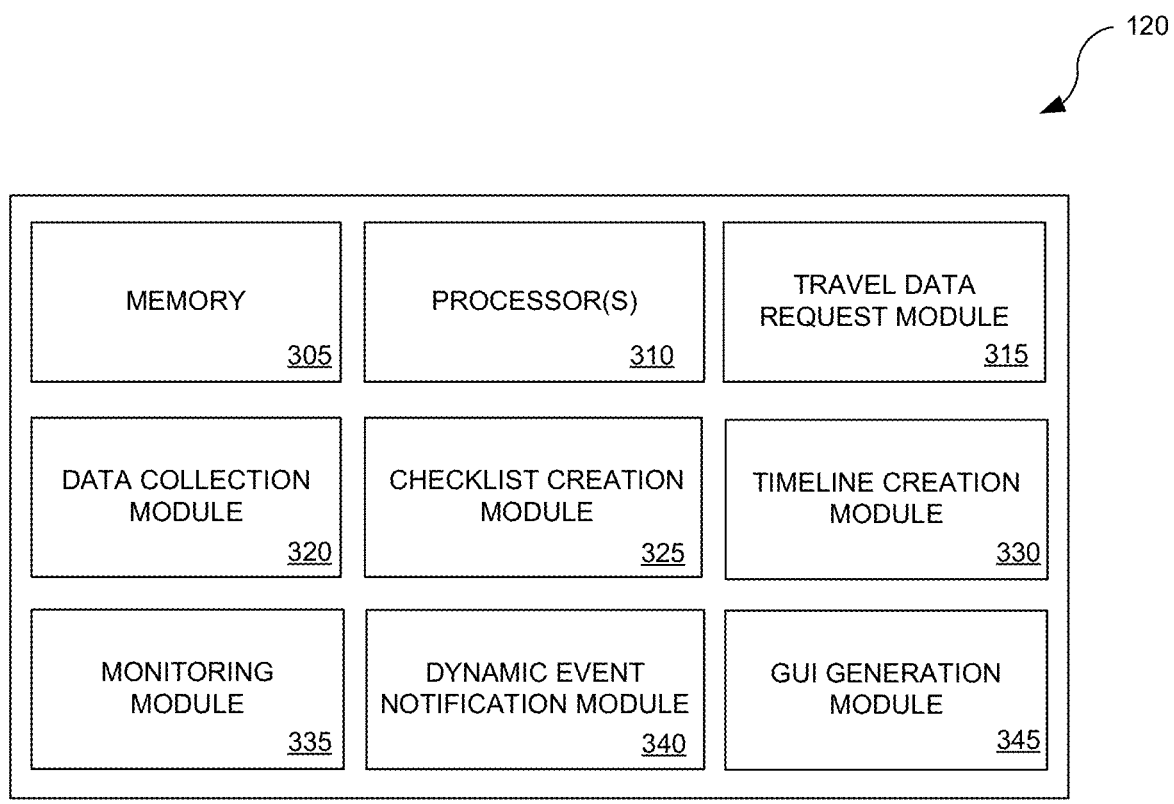
FIG. 3 illustrates various components of a smart travel platform that may be used in accordance with various embodiments of the present disclosure.

FIG. 3 illustrates a set of components within smart travel platform 120 according to one or more embodiments of the present disclosure. According to the embodiments shown in FIG. 3, smart travel platform 120 can include memory 305, one or more processors 310, travel data request module 315, data collection module 320, checklist creation module 325, timeline creation module 330, monitoring module 335, dynamic event notification module 340 and GUI generation module 345. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of travel data request module 315, data collection module 320, checklist creation module 325, timeline creation module 330, monitoring module 335, dynamic event notification module 340 and GUI generation module 345.

Travel data request module 315 can be configured to receive a request to assist with preparing for and navigating through a trip. Travel data request module 315 can request details regarding the trip, such as the destination location, dates of travel, a reason for travel (e.g., business, pleasure, event/type of event), and travel companions. This specific information can assist with building smart checklists for the trip.

Data collection module 320 can be configured to use the data received in travel data request module 315 and to collect data (e.g., from external and internal sources) that can help with preparing for and navigating through a trip. Sources may include various websites and databases containing information regarding weather, attractions, previous trips/checklists (e.g., to the same location or for a similar type of trip), travel insurance policies, government watches and health warnings, local news, transportation delays, accommodations, transportation, and pet watching services.

Checklist creation module 325 can be configured to generate one or more checklists. A new checklist can be created based on the dates of the travel, location, type of event, and preferences of the user. In some embodiments, a previous checklist can be used. Checklist creation module 325 can receive new items for the checklist from the user. In some embodiments, checklist creation module 325 can be configured to receive or assign tasks to other users. Such task assignments can be received from the user or can be automatically assigned based on previous assignments, skill sets, and/or preferences. Task assignments and statuses of the tasks (e.g., assigned, pending, completed) can be tracked in a database.

Timeline creation module 330 can be configured to categorize checklists and reminders based on a time prior to, during, or after the trip. The items on each checklist can correspond with items that can or should be completed around the specified timeframe. Tips relevant to the timeframe can be included as well. The tips and checklists in each timeframe can be categorized by topic. For example, one timeframe can be "a few months before the trip," and for this timeframe, timeline creation module 330 can include a category of "resources" and provide information and checklists such as travel warnings, travel updates, and information about vaccinations, as well as tasks such as booking accommodations, signing up for TSA pre-check (if relevant), and securing documents that may be necessary for the trip (e.g., passport, visa, international driving permits).

In another example, a few weeks before the trip, timeline creation module 330 can provide tips/checklists in the categories of money (e.g., trip savings, bill payments, currency), health (e.g., immunizations, notices from foreign governments, prescriptions), children (e.g., school arrangements, vaccinations, children's travel documents), and pets (e.g., pet travel documents, flight arrangements, pet carrier label, pet photo). A few days before departure, timeline creation module 330 can provide checklists in the categories of devices (e.g., mobile phone/tablet, camera equipment), packing (e.g., motion sickness, extra equipment), home (e.g., appliances, security system, light timers), and children (e.g., extra diapers, car seat and stroller). During the trip, timeline creation module 330 can issue informational updates such as government-issued warnings (e.g., heath-related, weather related) and smart device updates (e.g., status of smart devices, potential issues) and checklist items (e.g., taking a picture of the hotel or parking spot, bringing items to an event). After the trip, timeline creation module 330 can provide reminders and checklist items for miscellaneous task such as writing thank-you notes, organizing receipts, and developing/printing pictures.

Monitoring module 335 can be configured to automatically monitor resources (e.g., bank accounts, external websites, sensor data, home security systems) for pertinent information to provide to the user before, during or after the trip.

Dynamic event notification module 340 can be configured to issue notifications, reminders, and warnings to the user based on information received (e.g., travel warnings or delays, potential smart device issues), checklist items (e.g., reminder to complete a task, update that a second user completed an assigned task), or other reminders. Dynamic event notification module 340 can be sent to any device via any communication method (e.g., text, push notification, calendar reminder, email, automated call).

GUI generation module 345 is capable of generating one or more GUI screens that allow for interaction with a user. In at least one embodiment, GUI generation module 345 generates a graphical user interface receiving and/or conveying information to the user. For example, GUI generation module 345 may be configured to display a banner on the user's display based on the location of the travel and the reason for the trip (e.g., birthday trip to Napa Valley may include a banner with birthday balloons and with scenery from Napa Valley).

Figure 4:
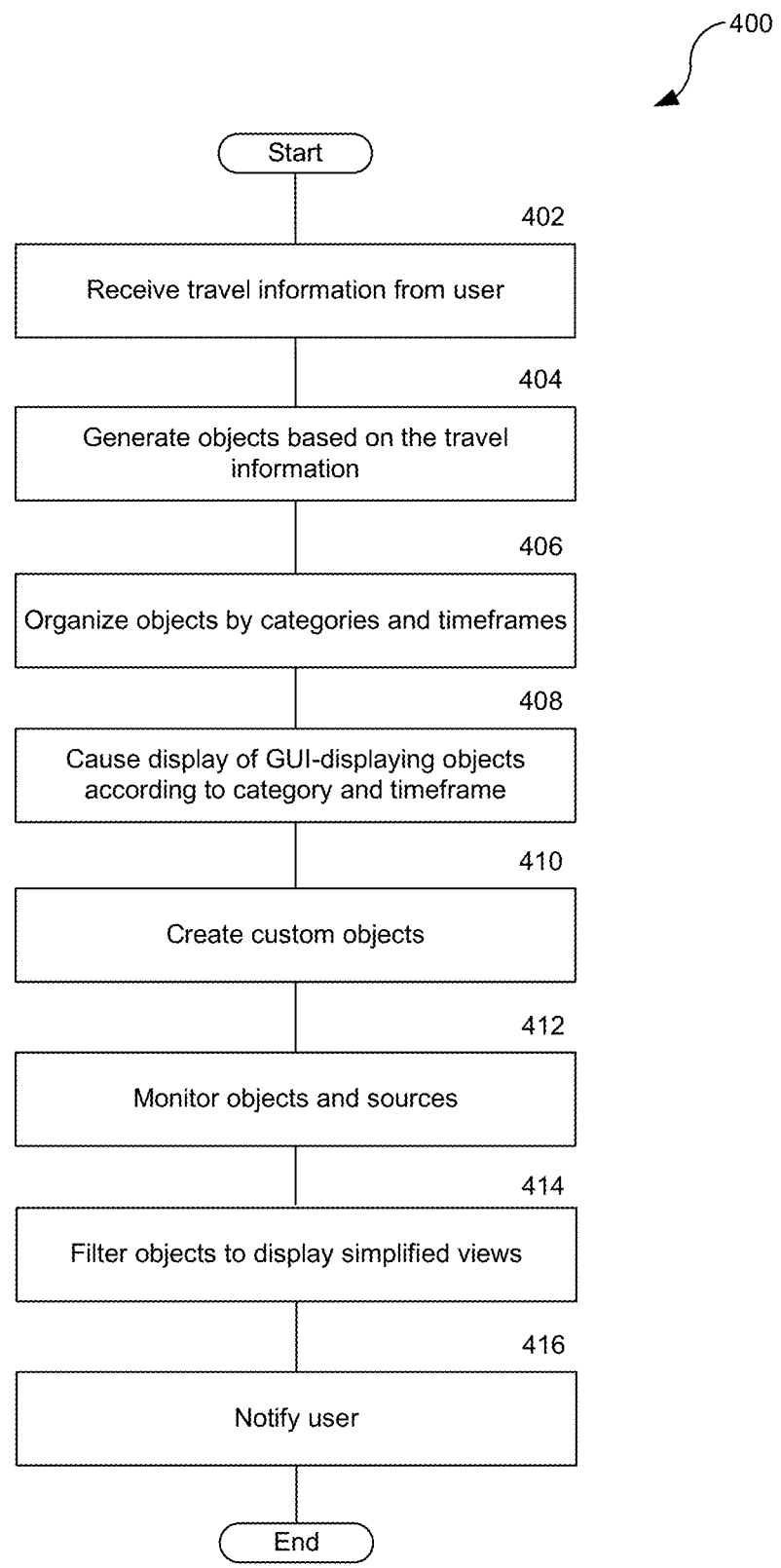
FIG. 4 is a flowchart illustrating a set of operations for generating a travel smartlist in accordance with various embodiments of the disclosure.
Figure 5:
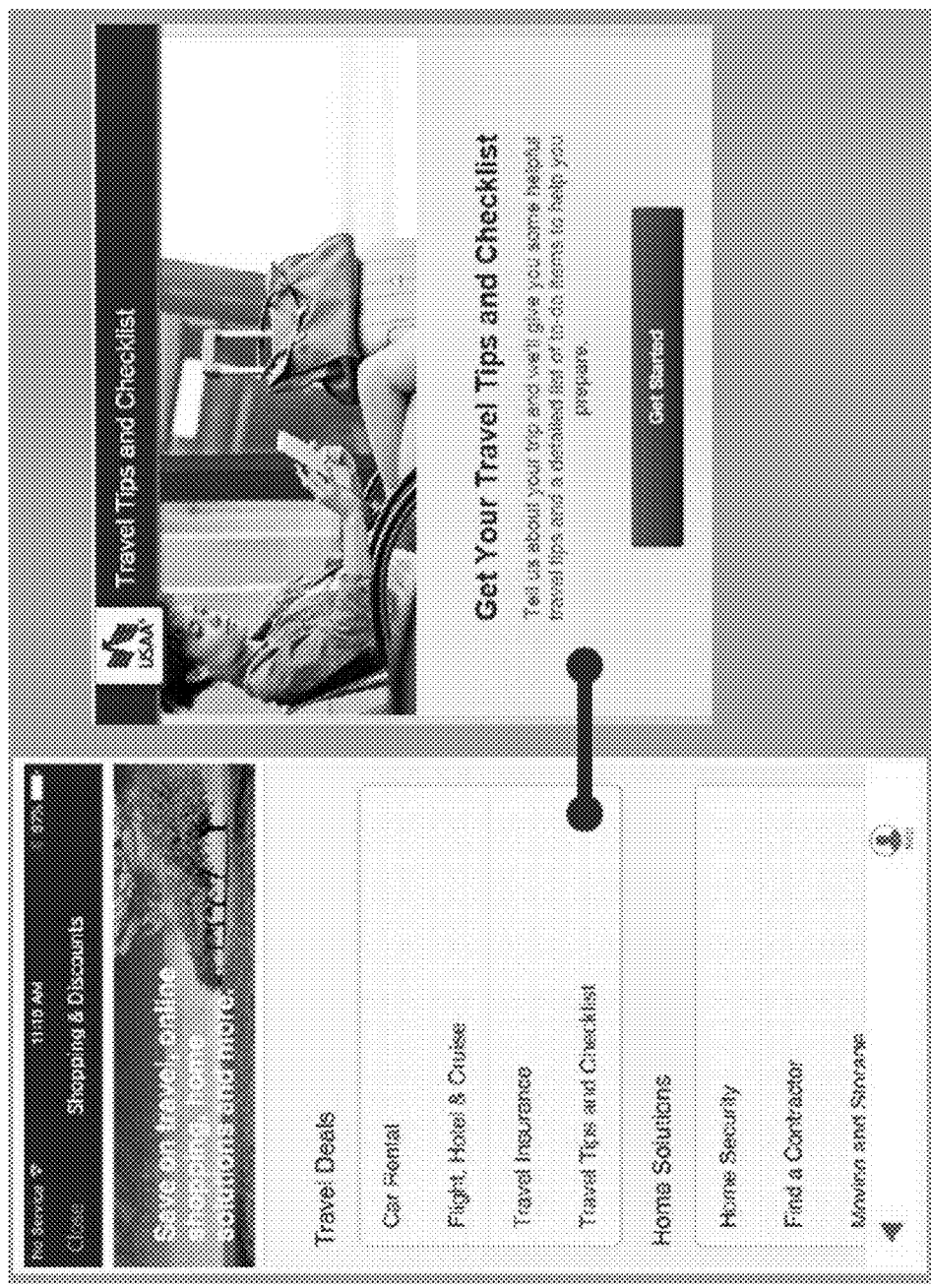
FIGS. 5-11 are examples of user interfaces that may be used in accordance with various embodiments of the present disclosure.
Figure 6:
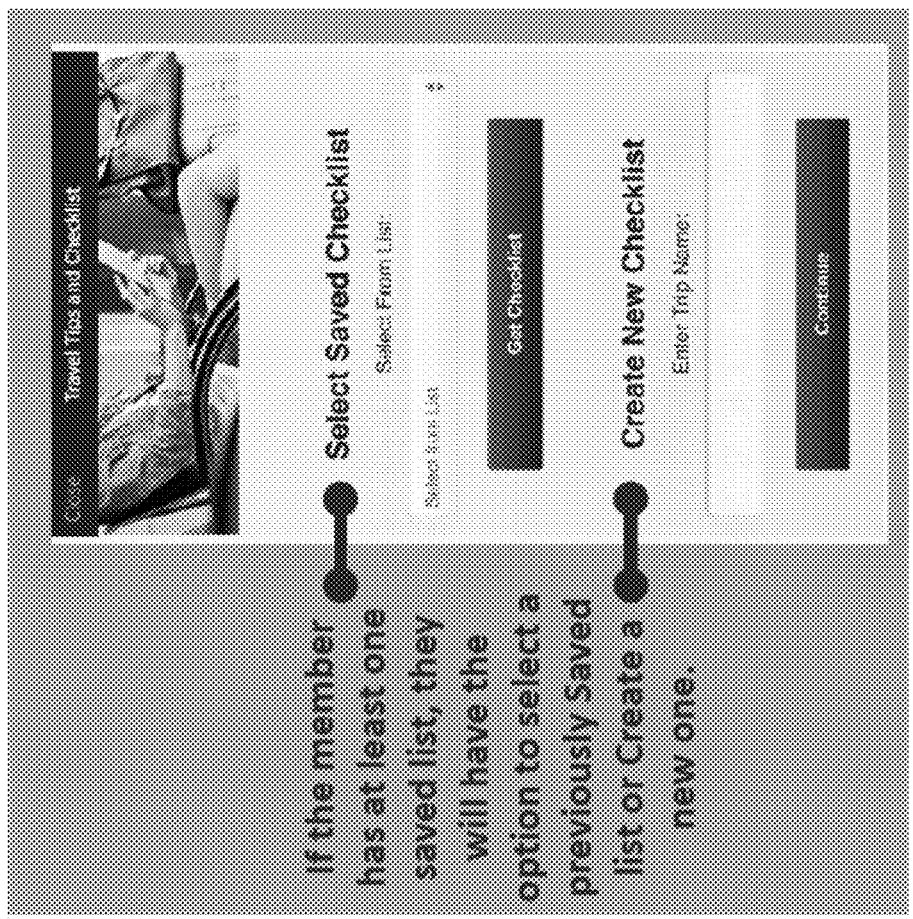
Figure 7:
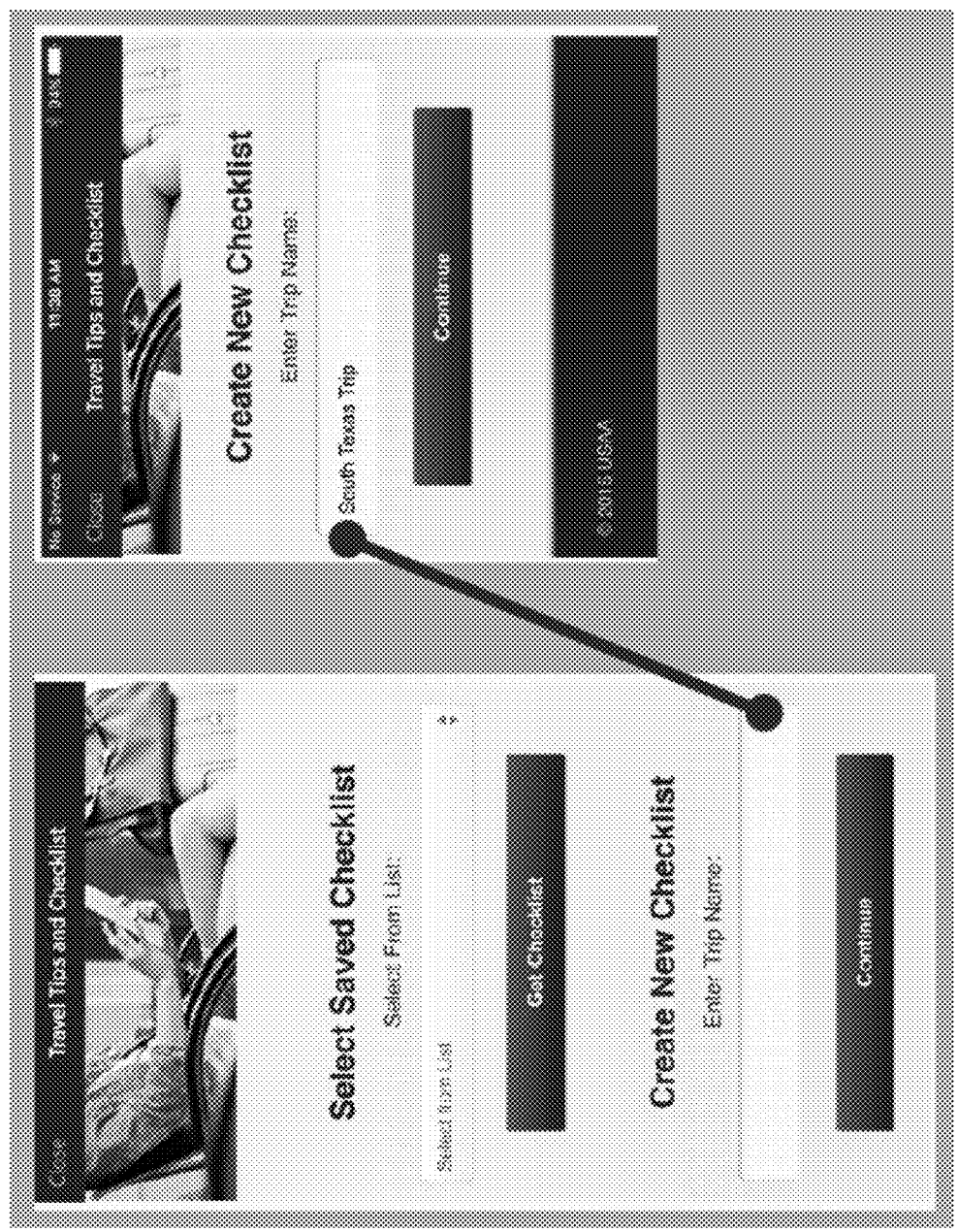
Figure 8:
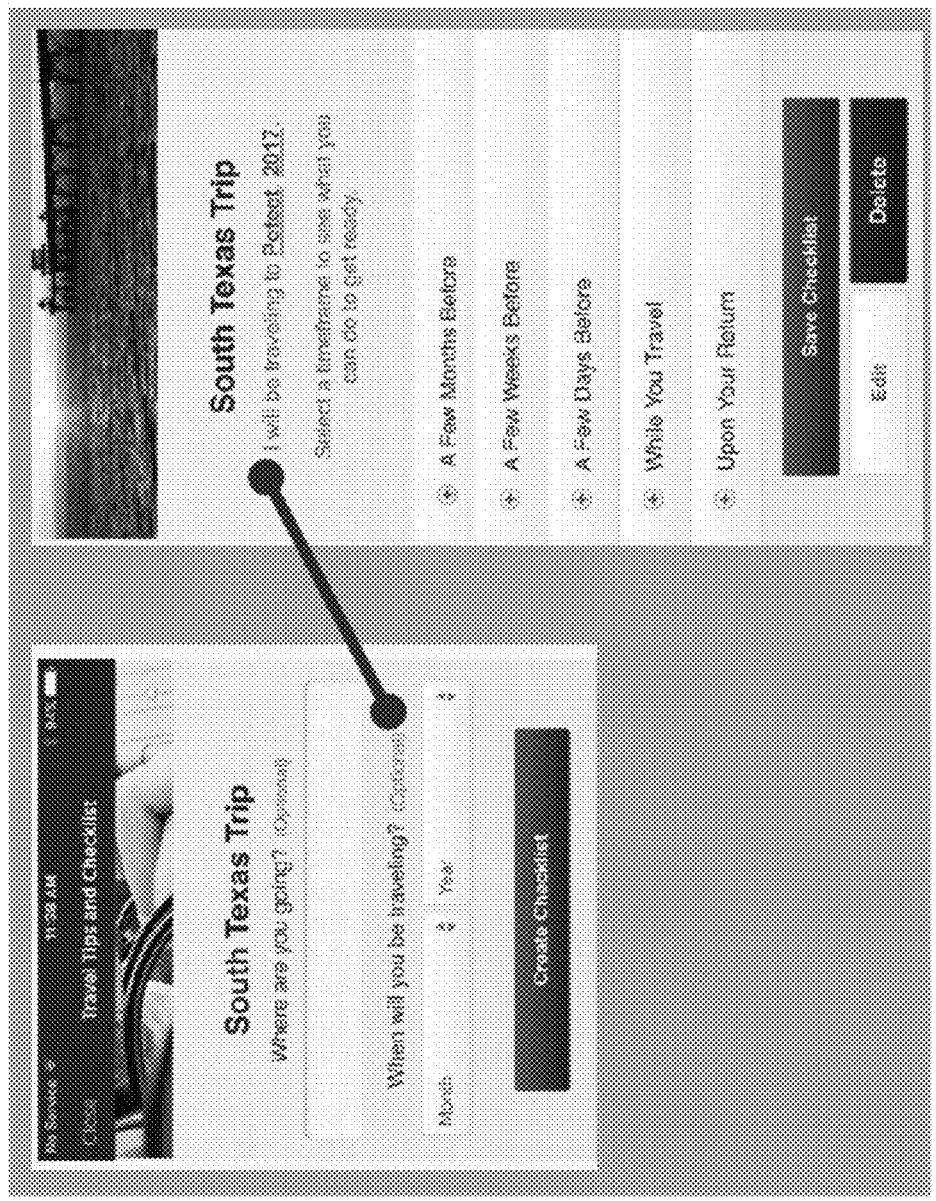

FIG. 4 is a flowchart illustrating a set of operations 400 for generating a travel smartlist. In some embodiments, fewer than all of the operations in each set of operations are performed, whereas in other embodiments additional operations are performed. Moreover, in some embodiments, the operations may be performed in different orders or in parallel. The operations can be performed by components of a device 200 illustrated in FIG. 2, smart devices 135, and/or various components of smart travel platform 120 illustrated in FIG. 3.

Receiving operation 402 receives travel information from a user (e.g., travel dates, location, purpose of travel). Generating operation 404 generates objects based on the travel information. Objects can include resources (e.g., links to websites), tips (e.g., "It is better to keep a limited amount of cash on hand in case of loss or theft"), or checklist items (e.g., exchange currency, arrange pet care). Organizing operation 406 organizes the objects by categories (e.g., money, documents, health, home) and timeframe in relation to the travel dates (e.g., a few months before the travel dates, a few weeks before the travel dates, during the travel dates, after the travel dates).

Displaying operation 408 causes the objects to be displayed on a display device according to category and timeframe. In some embodiments, after receiving a selection of a timeframe, the objects associated with a first category in the timeframe are arranged horizontally. The user can scroll left or right to see the objects in the category. The objects associated with a second category in the timeframe can be positioned below the objects associated with the first category, and the user can scroll left or right to view the objects in the second category. The user could select a second timeframe, and categories for the second timeframe can appear arranged similarly to the first timeframe (e.g., each category being arranged horizontally). In some embodiments, the categories in the first timeframe are different from those in the second timeframe. In other embodiments, the categories in the timeframes are the same but the objects may vary. Creating operation 410 creates custom objects should the user want to create personalized objects.

Monitoring operation 412 monitors objects and send reminders or notifications to users (e.g., "Apply for a passport by the end of the month to ensure you receive it in time for the trip," "Take a picture of your hotel to show the cab driver"). Monitoring operation 412 may further monitor websites or resources. Filtering operation 414 filters objects to display simplified views. The simplified views can be based on a status of tasks, for example: "all," "completed," "remaining." Notifying operation 416 may provide relevant information to the user (e.g., travel advisory to the destination location, weather). The information may be provided via updates to an application, a push notification, text message, email, and/or phone call. In some embodiments, information relating to smart devices at the user's home may be monitored and statuses may be sent to the user. In some implementations, the user (or the application) may authorize emergency procedures based on sensor data (e.g., call the fire department if the smoke alarm goes off).

Figure 9:
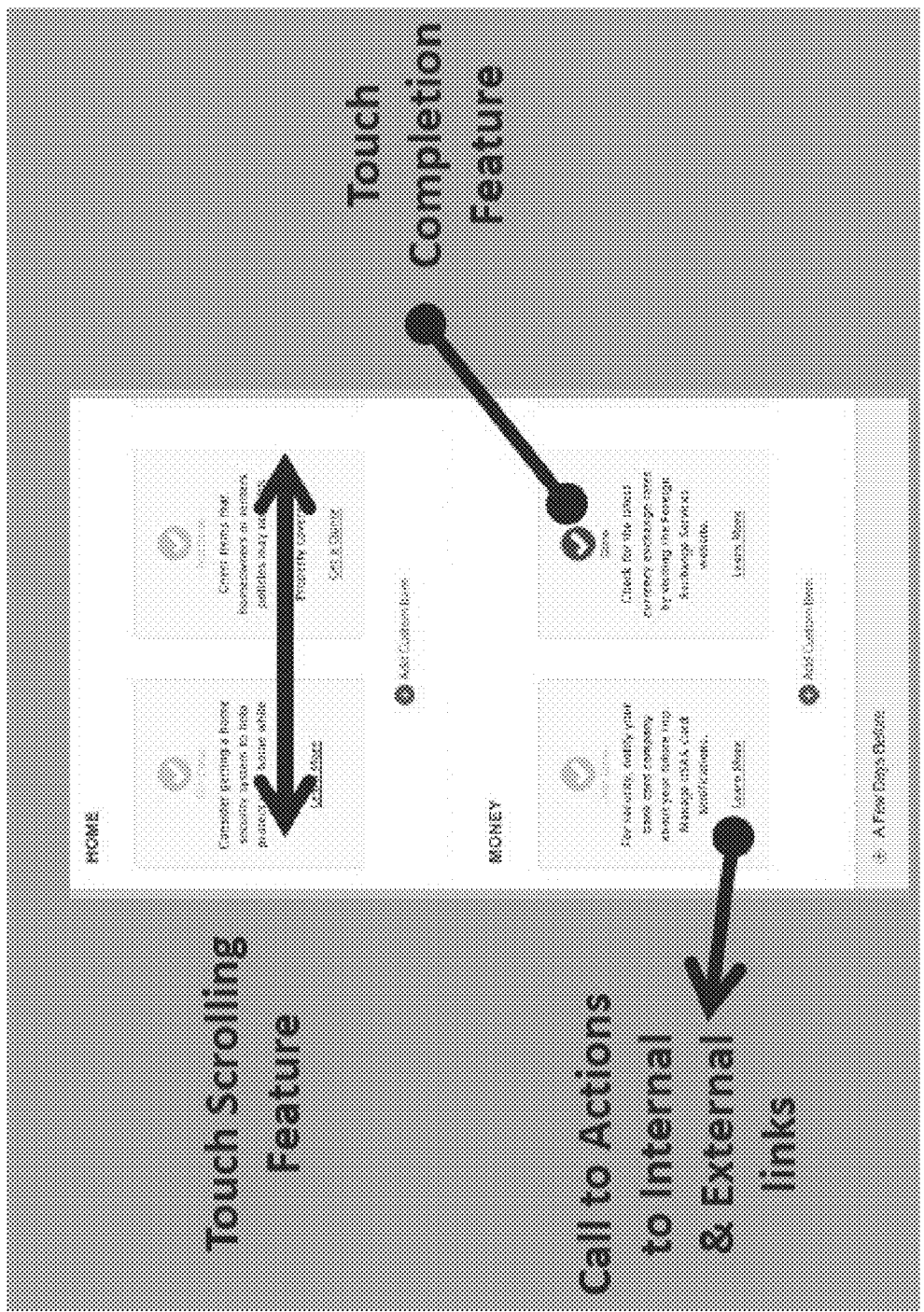

FIGS. 5-11 are examples of user interfaces to assist with managing travel. In the user interfaces depicted in FIG. 5, a user can select "Travel Tips and Checklist." Upon selection of this button, the user may see a screen inviting the user to provide information regarding the user's travel. In the user interfaces depicted in FIG. 6, the user can choose to select a saved checklist or create a new checklist. In the user interfaces depicted in FIG. 7, when the user selects "create new checklist," the user is invited to provide a trip name. In the user interfaces depicted in FIG. 8, the user is invited to provide a destination location and the dates of travel. Depending on the timeframe of the trip, the user can select a timeframe to see what the user can do to ensure that the user is ready for the trip. In each timeframe, the user can customize checklist items ("Add Custom Item"), as shown in FIG. 9. As shown in the user interfaces of FIG. 9, the checklist items can be arranged by category (e.g., home, money), and each checklist item can include a link to an internal or external source to learn more or take a specific action. The status of each checklist item can be indicated (e.g., "Done," "Not Done"). The checklists can be arranged so the user can scroll horizontally for each category of checklist items to see the remaining items, but the user can also scroll vertically to see additional categories of checklists.

Figure 10:
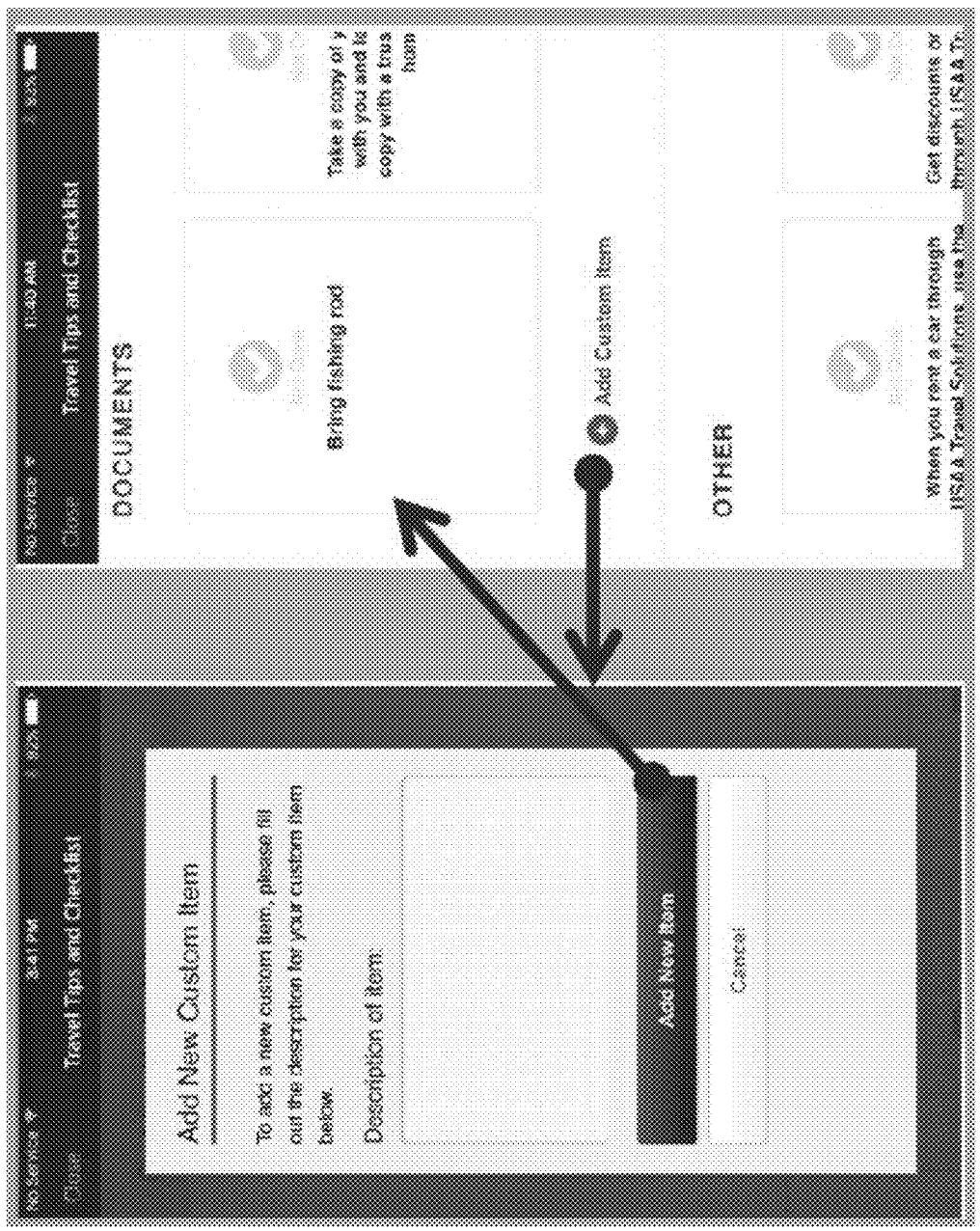
Figure 11:
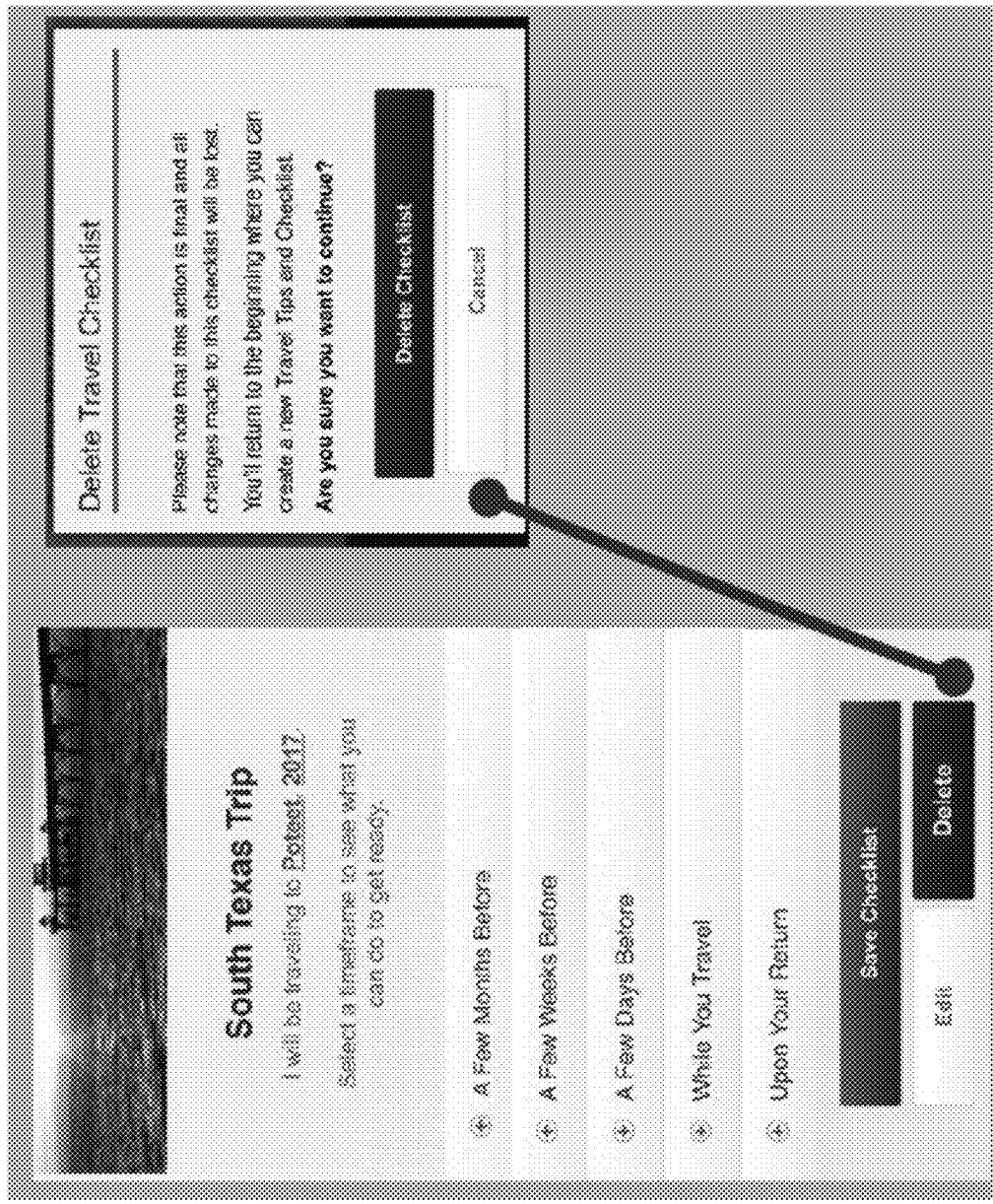

In the user interfaces depicted in FIG. 10, the user can add a new custom item, including a description (e.g., "Bring fishing rod"). In the user interfaces depicted in FIG. 11, the user can select "Delete Checklist" to delete the user's checklist.

Computer System Overview

Figure 12:
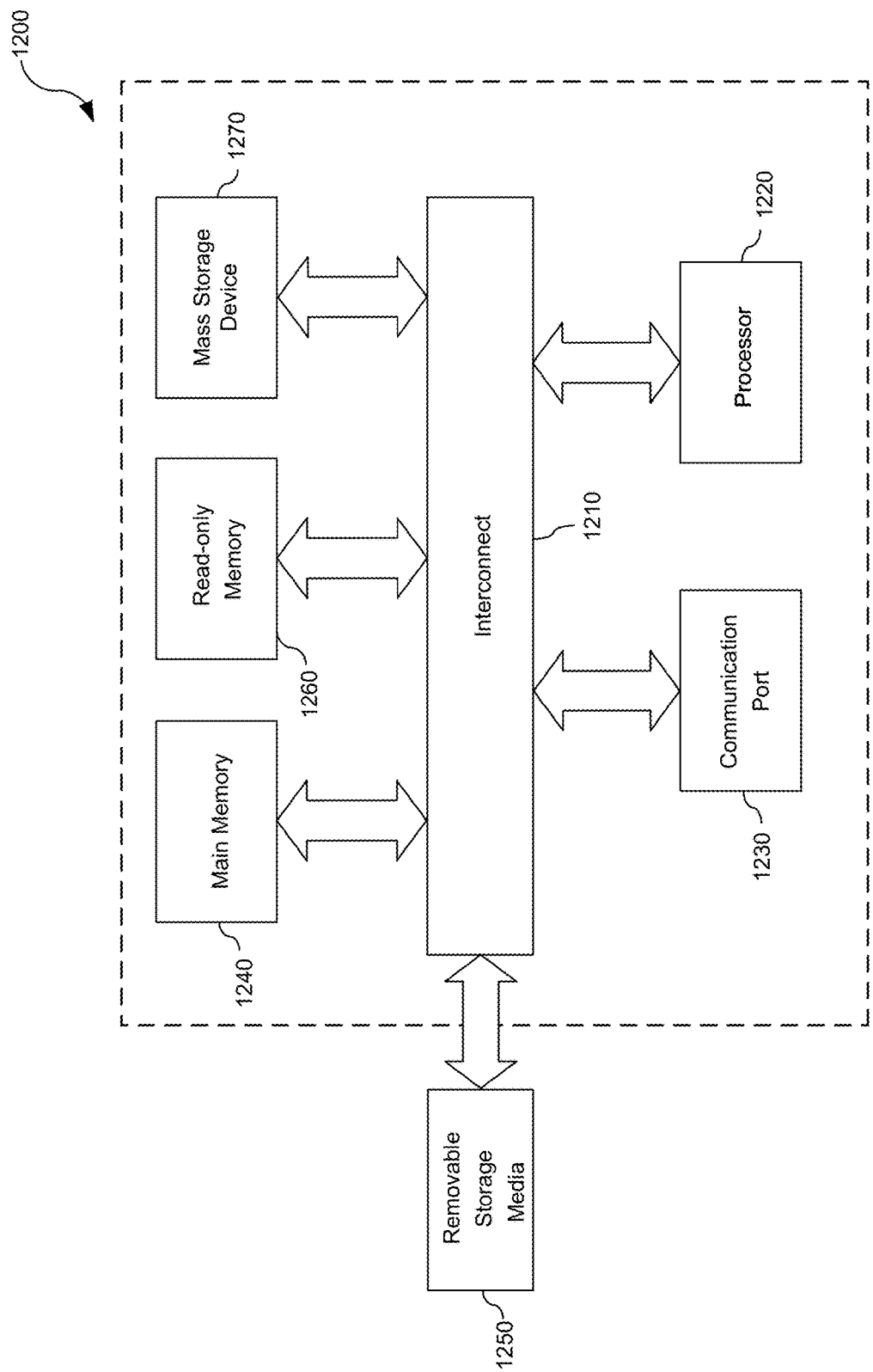
FIG. 12 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 12 is an example of a computer system 1200 with which embodiments of the present disclosure may be utilized. According to the present example, the computer system includes an interconnect 1210, at least one processor 1220, at least one communication port 1230, a main memory 1240, a removable storage media 1250, a read-only memory 1260, and a mass storage device 1270.

Processor(s) 1220 can be any known processor, such as, but not limited to, an Intel® Itanium® or Itanium 2® processor(s), or AMD® Opteron® or Athlon MP® processor(s), or Motorola® lines of processors. Communication port(s) 1230 can be any of an RS-232 port for use with a modem-based dialup connection, a 10/100 Ethernet port, or a Gigabit port using copper or fiber. Communication port(s) 1230 may be chosen depending on a network such a Local Area Network (LAN), Wide Area Network (WAN), or any network to which the computer system 1200 connects.

Main memory 1240 can be Random-access Memory (RAM) or any other dynamic storage device(s) commonly known in the art. Read-only memory 1260 can be any static storage device(s) such as Programmable Read-only Memory (PROM) chips for storing static information, such as instructions for processor 1220.

Mass storage device 1270 can be used to store information and instructions. For example, hard disks such as the Adaptec® family of SCSI drives, an optical disc, an array of disks such as RAID, the Adaptec family of RAID drives, or any other mass storage devices may be used.

Interconnect 1210 communicatively couples processor(s) 1220 with the other memory, storage, and communication blocks. Interconnect 1210 can be a PCI/PCI-X- or SCSI-based system bus, depending on the storage devices used.

Removable storage media 1250 can be any kind of external hard drives, floppy drives, IOMEGA® Zip Drives, Compact Disc Read-only Memory (CD-ROM), Compact Disc-Rewritable (CD-RW), Digital Video Disc Read-only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a LAN or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for managing travel. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A system comprising:
a processor;
a memory having instructions stored thereon that, when executed by the processor, cause a machine to:
receive, from a device associated with a user, a travel destination and at least one date associated with a trip to the travel destination;
generate multiple objects based on the travel destination and the at least one date, wherein the multiple objects comprise checklists and tips for the trip;
identify multiple categories based on the multiple objects, wherein the multiple objects are grouped according to the multiple categories, and wherein each of the multiple categories is a type for the checklists and tips for the trip;
generate multiple timeframes based on the at least one date, wherein each of the multiple timeframes is specified, in part, in terms of an amount of time to the at least one date, and wherein the multiple timeframes correspond to when preparations for aspects of the trip should be completed;
organize the multiple objects according to the multiple categories and the multiple timeframes;
add multiple actionable links for two or more of the multiple objects, wherein each of the multiple actionable links allows the user to take a specific action relating to the corresponding object; and
cause a graphical user interface to be displayed on a display device, wherein the graphical user interface:
displays visual representations of the multiple objects, visual representations of the multiple timeframes, and visual indications of the multiple categories;
upon receiving a selection within the graphical user interface of a first timeframe, of the multiple timeframes:
displays, horizontally, the visual representations of a first set of the multiple objects, the first set being associated with the first timeframe and a first category, of the multiple categories, and
displays, horizontally, the visual representations of a second set of the multiple objects, the second set being associated with the first timeframe and a second category of the multiple categories, wherein the second category and the first category are different categories and the visual representations of the second set of the multiple objects and a visual indication of the second category are positioned below the visual representations of the first set of the multiple objects and a visual indication of the first category, and
upon receiving a selection within the graphical user interface of a second timeframe, of the multiple timeframes:
displays, horizontally, the visual representations of a third set of the multiple objects, the third set being associated with the second timeframe and a third category, of the multiple categories, and
wherein the user can scroll horizontally to view the multiple objects associated with each category, of the multiple categories, and vertically to view the objects, of the multiple objects, associated with other categories of the multiple categories, and
displays the actionable links with the multiple objects, and upon the user selecting an actionable link, sends the user to a corresponding source comprising a website that enables the user to perform actions relating at least to the corresponding object displayed with the selected actionable link.

2. The system of claim 1, wherein the first category and the third category are a same category.

3. The system of claim 1, wherein the multiple objects include at least one of: reminders and resources.

4. The system of claim 1, wherein the multiple objects include a task, wherein the instructions, when executed by the processor, further cause the machine to:
receive, from the device associated with the user, a request to assign the task to a second user; and
send a notification of the task to a device associated with the second user.

5. The system of claim 1, wherein the multiple timeframes include at least one of: a few months prior to the at least one date, a few weeks prior to the at least one date, during the at least one date, and after the at least one date.

6. The system of claim 1, wherein the multiple categories include at least one of: resources, children, and pets.

7. The system of claim 1, wherein one or more objects of the multiple objects include a status indicator indicating a completion status of the one or more objects.

8. The system of claim 1, wherein the multiple timeframes are data structures used to organize objects to be completed.

9. The system of claim 1, further comprising a network of sensors configured to monitor home devices and to send a status of the home devices to the device associated with the user during the at least one date.

10. The system of claim 9, wherein the home devices include at least one of: a garage door, a washing machine, an HVAC system, a furnace, a dishwasher, or a hot water heater.

11. The system of claim 9, wherein the set of instructions, when executed by one or more processors, further cause the machine to effectuate emergency procedures based on the sensor data during the at least one date.

12. A non-transitory, computer-readable storage medium comprising a set of instructions that, when executed by one or more processors, cause a machine to:
receive, from a device associated with a user, a travel destination and at least one date associated with a trip to the travel destination;
generate multiple objects based on the travel destination and the at least one date, wherein the multiple objects comprise checklists and tips for the trip;
identify multiple categories based on the multiple objects, wherein the multiple objects are grouped according to the multiple categories, and wherein each of the multiple categories is a type for the checklists and tips for the trip;
generate multiple timeframes based on the at least one date, wherein each of the multiple timeframes is specified, in part, in terms of an amount of time to the at least one date, and wherein the multiple timeframes correspond to when preparations for aspects of the trip should be completed;

organize the multiple objects according to the multiple categories and the multiple timeframes;

add multiple actionable links for two or more of the multiple objects, wherein each of the multiple actionable links allows the user to take a specific action relating to the corresponding object; and cause a graphical user interface to be displayed on a display device, wherein the graphical user interface:

displays visual representations of the multiple objects, visual representations of the multiple timeframes, and visual indications of the multiple categories;

upon receiving a selection within the graphical user interface of a first timeframe, of the multiple timeframes:

displays, horizontally, the visual representations of a first set of the multiple objects, the first set being associated with the first timeline and a first category, of the multiple categories, and displays, horizontally, the visual representations of a second set of the multiple objects, the second set being associated with the first timeframe and a second category of the multiple categories, wherein the second category and the first category are different categories and the visual representations of the second set of the multiple objects and a visual indication of the second category are positioned below the visual representations of the first set of the multiple objects and a visual indication of the first category, and upon receiving a selection within the graphical user interface of a second timeframe, of the multiple timeframes:

displays, horizontally, the visual representations of a third set of the multiple objects, the third set being associated with the second timeframe and a third category, of the multiple categories, wherein the user can scroll horizontally to view the multiple objects associated with each category, of the multiple categories, and vertically to view the objects, of the multiple objects, associated with other categories of the multiple categories, and displays the actionable links with the multiple objects, and upon the user selecting an actionable link, sends the user to a corresponding source comprising a website that enables the user to perform actions relating at least to the corresponding object displayed with the selected actionable link.

13. The non-transitory, computer-readable storage medium of claim 12, wherein the first category and the third category are a same category.

14. The non-transitory, computer-readable storage medium of claim 12, wherein the multiple objects include at least one of: reminders and resources.

15. The non-transitory, computer-readable storage medium of claim 12, wherein the multiple objects include a task, wherein the set of instructions, when executed by the or one or more processors, further cause the machine to:

receive, from the device associated with the user, a request to assign the task to a second user; and send a notification of the task to a device associated with the second user.

16. The non-transitory, computer-readable storage medium of claim 12, wherein the multiple timeframes include at least one of: a few months prior to the at least one date, a few weeks prior to the at least one date, during the at least one date, and after the at least one date.

17. The non-transitory, computer-readable storage medium of claim 12, wherein the set of instructions, when executed by the one or more processors, further cause the machine to communicate with a network of sensors configured to monitor home devices and to send a status of the home devices to the device associated with the user during the at least one date.

18. The non-transitory, computer-readable storage medium of claim 17, wherein the home devices include at least one of: a garage door, a washing machine, an HVAC system, a furnace, a dishwasher, or a hot water heater.

19. The non-transitory, computer-readable storage medium of claim 12, wherein the graphical user interface further displays a banner relating to the travel destination and a purpose of the trip.

20. A method comprising:

receiving, from a device associated with a user, a travel destination and at least one date associated with the a trip to the travel destination;

generating multiple objects based on the travel destination and the at least one date, wherein the multiple objects comprise checklists and tips for the trip;

identifying multiple categories based on the multiple objects, wherein the multiple objects are grouped according to the multiple categories, and wherein each of the multiple categories is a type for the checklists and tips for the trip;

generating multiple timeframes based on the at least one date, wherein each of the multiple timeframes is specified, in part, in terms of an amount of time to the at least one date, and wherein the multiple timeframes correspond to when preparations for aspects of the trip should be completed;

organizing the multiple objects according to the multiple categories and the multiple timeframes;

adding multiple actionable links to two or more of the multiple objects, wherein each of the multiple actionable links allows the user to take a specific action relating to the corresponding object; and causing a graphical user interface to be displayed on a display device, wherein the graphical user interface:

displays visual representations of the multiple objects, visual representations of the multiple timeframes, and visual indications of the multiple categories;

upon receiving a selection within the graphical user interface of a first timeframe, of the multiple timeframes:

displays, horizontally, the visual representations of a first set of the multiple objects, the first set being associated with the first timeframe and a first category, of the multiple categories, and displays, horizontally, the visual representations of a second set of the multiple objects, the second set being associated with the first timeframe and a second category of the multiple categories, wherein the second category and the first category are different categories and the visual representations of the second set of the multiple objects and a visual indication of the second category are positioned below the visual representations of the first set of the multiple objects and a visual indication of the first category, and upon receiving a selection within the graphical user interface of a second timeframe, of the multiple timeframes:

displays, horizontally, the visual representations of a third set of the multiple objects, the third set being associated with the second timeframe and a third category, of the multiple categories, wherein the user can scroll horizontally to view the multiple objects associated with each category, of the multiple categories, and vertically to view the objects, of the multiple objects, associated with other categories of the multiple categories; and displays the actionable links with the multiple objects, and upon the user selecting an actionable link, sends the user to a corresponding source comprising a website that enables the user to perform actions relating at least to the corresponding object displayed with the selected actionable link.

* * * * *